United States Patent Office 3,579,575
Patented May 18, 1971

3,579,575
PROCESS FOR OXIDIZING LOWER ALIPHATIC ALDEHYDES
Albert Bouniot, Melle, Deux-Sevres, France, assignor to Melle-Bezons, Melle, Deux-Sevres, France
No Drawing. Filed May 8, 1968, Ser. No. 727,705
Claims priority, application France, May 26, 1967, 107,982
Int. Cl. C07c 53/22
U.S. Cl. 260—530                                14 Claims

ABSTRACT OF THE DISCLOSURE

Process for oxidizing lower aliphatic aldehydes wherein the oxidation is carried out by passage of an oxygen containing gas through a liquid medium containing the aldehyde, in which the liquid medium comprises heterogeneous liquid phases, one of which is an aqueous phase.

---

It is known that aliphatic carboxylic acids can be produced by oxidizing the corresponding aldehydes in liquid phase by means of molecular oxygen or a gas containing same, for example air, injected into the reaction medium or mixture. The oxidation is generally carried out in the presence of salts of certain heavy metals, such as cobalt or manganese, acting as oxidation catalysts. Where certain aldehydes are dealt with, more particularly branched-chain aldehydes and olefinically-unsaturated aldehydes, for example isobutyraldehyde and crotonaldehyde, the use of such catalysts leads to comparatively low yields and production of acids having an undesirable yellow color.

It is known that the aforementioned inconveniences can be avoided by carrying out the oxidation reaction in the absence of catalyst, but in that case the peroxide content of the reaction mixture may become very high and cause serious accidents because peroxides are dangerous products which can give rise to explosions. Among the lower aliphatic aldehydes, those which involve this serious inconvenience are principally those which have a methyl branched chain, i.e., a side methyl group attached to their carbon chain, those which have an olefinic linkage and those, with normal or branched chain, which have been produced by the Oxo synthesis.

It is an object of this invention to provide a more efficient method for oxidizing lower aliphatic aldehydes of the type described.

The present invention relates to an improved process which allows the aforementioned inconveniences to be avoided, at least to a large extent. Operating in a liquid phase, through which molecular oxygen or an oxygen containing gas is passed, the process may be used to oxidize aliphatic aldehydes having from four to five carbon atoms in their molecule and a normal or a methyl branched chain which may contain an olefinic linkage, provided the latter is not situated at the end of the chain. The most usual aldehydes to which the present oxidation process is applicable are isobutyraldehyde, n-butyraldehyde, isovaleraldehyde and n-valeraldehyde, especially when these aldehydes have been produced by the Oxo synthesis, and also crotonaldehyde.

In accordance with the process of the present invention, the oxidation reaction is carried out in the presence of water in an amount such that the reaction medium or mixture is heterogeneous, i.e., in the presence of an aqueous liquid phase separate from the organic liquid phase.

The amount of water to be added to the starting aldehyde varies according to the solubility of water in the reaction medium or mixture. It is preferred that the volume of separate aqueous liquid phase is at least 2 percent, and preferably 5 to 10 percent, of the total volume of the reaction medium or mixture. It should be noted that the volume of separate aqueous phase can well be still larger without any inconvenience other than the resulting decrease in productivity per unit of volume of reaction medium or mixture. Accordingly, the starting amount of water to be introduced is preferably from about 10 percent to about 20 percent by volume, of the reaction medium or mixture.

Without the process of the present invention being bound in any way to the following theory, the influence of water in separate phase may be explained by phenomena occurring at the interface between the two liquid phases, which interface has a considerable area by reason of the stirring action generated by the passage of the oxidizing gas through the mixture. It may be assumed that the hydrophilic groups of the peroxide functions of the percarboxylic acids formed in the mixture are mainly at the interface, on the side of the aqueous phase, while the oleophilic hydrocarbon chains of the same acids remain on the side of the organic phase. Accordingly, the peroxidic functions would decompose within a highly aqueous medium, so that the native oxygen resulting from the decomposition could not act upon the side chains or the olefinic linkages of the hydrocarbon chains which are protected by their being present substantially only within the organic phase. This theory thus explains what is actually found, i.e., a lower content of peroxides and an increase of the yields as compared with the oxidation operation carried out in the conventional way, i.e., without metal salt catalyst and separate aqueous phase. In addition, the acids produced by the present process are colorless.

Though the present process is carried out preferably in the absence of catalyst, it is within the scope of the present invention to add to the reaction medium or mixture a catalyst for the desired reaction and/or an inhibitor for possible secondary reactions, for example a zinc or sodium salt.

The reaction medium or mixture may comprise a diluent or a solvent which is chemically inert and substantially water-immiscible under the operation conditions, the role of such diluent or solvent being either to make easier the separation of the aqueous phase from the organic phase or, as is conventional, to increase the yield through dilution of the mixture, more particularly where olefinic aldehydes are to be oxidized. The diluent or solvent may be an ester, such as n-butyl acetate, an ether, such as di-n-butyl ether, a hydrocarbon, such as toluene, or a mixture of at least two such substances.

The temperature for the oxidation reaction is preferably within the range of 10° to 65° C. It is advisable to operate at atmospheric pressure but it also possible, to increase the reaction speed, to work at a different pressure, more especially under a moderate pressure, preferably not above 5 bars.

The operation may be carried out either batchwise or continuously. Operating batchwise, the solubility of water in the carboxylic acid formed may cause homogenization of the reaction mixture by the end of the oxidation reaction. However, this phenomenon is of substantially no consequence because only comparatively small amounts of peroxides are formed at that stage of the operation. It may be said that in carrying out the present process, it is only essential that the liquid reaction medium or mixture remains heterogenous at least for approximately ⅘ of the duration of the operation.

For continuous operation, the reactor may be fed continuously with aldehyde to be oxidized, and a corresponding amount of reaction mixture is continuously withdrawn therefrom. The withdrawn mixture is sent to a decanter in which the aqueous phase separates from the organic phase as a lower layer which is returned to the reactor, possibly through gravity. There is also fed to the reactor an amount of water to compensate for the amount thereof withdrawn in dissolved state with the organic layer. Determination of the rate of flow of lower layer with respect to upper layer allows the separation rate of the liquid phases in the reactor to be determined and controlled through water introduction.

The following, non-limiting examples illustrate various ways of carrying out the process of the invention and comparison thereof with conventional techniques.

EXAMPLE 1

In a reactor formed with a vertical cylinder provided at its lower part with a conventional perforated plate for introduction of gas, there is placed 720 g. of isobutyraldehyde produced by the Oxo synthesis and 240 g. of water. The temperature in the reactor is maintained at 25° C., and there is introduced through the base thereof 250 liters per hour of air. The gases leaving the reactor are contacted with water in a washing column, to recover entrained products.

After a run of nine hours, the peroxide content (calculated as perisobutyric acid) of the bath is 8 g. per liter. The oxidation reaction is then stopped. The reaction mixture is still heterogeneous.

From this mixture there is recovered 530 g. of isobutyric acid and 21.5 g. of unconverted isobutyraldehyde. The water with which the gases were washed contains 18 g. of isobutyric acid and 209 g. of isobutyraldehyde. Thus the total amounts recovered are 548 g. of isobutyric acid and 230.5 g. of isobutyraldehyde, corresponding to a conversion rate of 68 percent of the isobutyraldehyde and an isobutyric acid yield of 91.6 percent with respect to the isobutyraldehyde converted.

Besides the isobutyric acid, there is formed isopropyl formate, isopropanol and acetone.

EXAMPLE 2

The operation of Example 1 is repeated except that the starting amount of water is 120 g. instead of 240 g.

After seven hours running, the reaction mixture becomes homogeneous. After nine hours running, the peroxide content (calculated as perisobutyric acid) of the bath is 27 g. per liter. The oxidation reaction is then stopped. The reaction mixture still contains 22 g. of unconverted isobutyraldehyde. The total amounts of products recovered are 527 g. of isobutyric acid and 225 g. of isobutyraldehyde, corresponding to a conversion rate of 69 percent of the isobutyraldehyde and an isobutyric acid yield of 87.1 percent with respect to the isobutyraldehyde converted.

EXAMPLE 3

The operation of Example 1 is repeated except that the starting amount of water is only 15 g. which dissolves in the reaction medium or mixture, to form a homogeneous phase, contrary to the principle of the present process.

The peroxide content of the bath increases very rapidly as soon as the reaction has begun and reaches about 80 g. per liter after a reaction time of 4–5 hours. The operation is stopped after 7 hours. The reaction mixture still contains 18 g. of unconverted isobutyraldehyre. The total amounts of products recovered are 544 g. of isobutyric acid and 190 g. of isobutyraldehyde, corresponding to a conversion rate of 73.5 percent of the isobutyraldehyde, and an isobutyric acid yield of 84 percent with respect to the isobutyraldehyde converted.

EXAMPLE 4

The operation of Example 3 is repeated except that g. of manganese acetate is added to the starting reaction mixture as an oxidation catalyst.

The peroxide content of the bath does not exceed 7 g. per liter. The operation is stopped after 6 hours running. The reaction mixture then contains only 12 g. of unconverted isobutyraldehyde. The total amounts of products recovered are 428 g. of isobutyric acid and 172 g. of isobutyraldehyde, corresponding to a conversion rate of 76 percent of the aldehyde and an isobutyric acid yield of only 64 percent. The acid obtained has a strong yellow color, whereas the acid produced in the foregoing and following examples is colorless.

EXAMPLE 5

The operation of Example 1 is repeated except that instead of isobutyraldehyde there is used an equal amount of n-butyraldehyde produced by the Oxo synthesis.

The peroxide content (calculated as perbutyric acid) of the bath does not exceed 9 g. per liter. The operation is stopped after 11 hours. The reaction mixture then contains only 25 g. of unconverted butyraldehyde.

The total amounts of products recovered are 612 g. of butyric acid and 200 g. of butyraldehyde. The aldehyde conversion rate is 72.3 percent and the acid yield is 96.3 percent.

EXAMPLE 6

The operation of Example 5 is repeated except that the starting amount of water is only 10 g. dissolved in the reaction medium or mixture, thus in homogeneous phase.

The peroxide content of the bath reaches 29 g. per liter. The operation is stopped after 10 hours running. The reaction mixture then contains only 22 g. of unconverted butyraldehyde. The total amounts of products recovered are 628 g. of butyric acid and 183 g. of butyraldehyde. The aldehyde conversion rate is 74.6 percent and the acid yield is 95.7 percent.

EXAMPLE 7

In the apparatus of Example 1, there is placed 860 g. of isovaleraldehyde produced by dehydrogenation of isoamyl alcohol and 180 g. of water. The temperature in the reactor is maintained at 35° C. and there is introduced through the base thereof 500 liters per hour of air. The gases leaving the reactor are contacted with di-n-butyl ether in a washing column, to recover the entrained products.

After 7 hours and 30 minutes running, the peroxide content (calculated as perisovaleric acid) of the bath is 9 g. per liter. The operation is then stopped. The reaction mixture still contains 60 g. of unconverted isovaleraldehyde. The total amounts of products recovered are 667.5 g. of isovaleric acid and 275 g. of isovaleraldehyde. The aldehyde conversion rate is 68 percent and the acid yield is 96.2 percent.

EXAMPLE 8

The operation of Example 7 is repeated except that no water is introduced.

The peroxide content of the bath reaches 45 g. per liter. The operation is stopped after 7 hours running. The reaction mixture still contains 52 g. of unconverted isovaleraldehyde. The total amounts of products recovered are 680 g. of isovaleric acid and 256 g. of isovaleraldehyde. The aldehyde conversion rate is 70.2 percent and the acid yield is 95 percent.

EXAMPLE 9

In the apparatus of Example 1, there is placed 420 g. of crotonaldehyde, 300 g. of di-n-butyl ether as a diluent and 220 g. of water. The temperature in the reactor is maintained at 55° C., and there is introduced through the base thereof 250 liters per hour of air. The gases leaving the reactor are passed through a condenser and the condensed liquid is returned to the reactor. The remaining gases are continuously washed with di-n-butyl ether in a washing column, the liquid resulting from the washing operation is continuously rectified, the crotonaldehyde is thereby recovered therefrom and is continuously returned to the reactor.

After 8 hours running, the reaction bath remains heterogeneous and its peroxide content (calculated as percrotonic acid) is 18 g. per liter. The operation is then stopped. The final reaction mixture contains:

| | Grams |
|---|---|
| Di-n-butyl ether | 300 |
| Water | 220 |
| Crotonic acid | 292.5 |
| Crotonaldehyde | 155 |
| By-products | 39 |

The by-products mainly comprise acetic, formic, 2,3-epoxy butyric and 2,3-dioxy butyric acids, and polymerization products.

The crotonaldehyde conversion rate is 63 percent and the crotonic acid yield is 90 percent.

EXAMPLE 10

The operation of Example 9 is repeated except that the amount of starting water is only 40 g.

Under these conditions the reaction mixture rapidly becomes homogeneous. After 8 hours running the peroxide content thereof reaches 80 g. per liter. The operation is then stopped. The final reaction mixture contains:

| | Grams |
|---|---|
| Di-n-butyl ether | 300 |
| Water | 40 |
| Crotonic acid | 274 |
| Crotonaldehyde | 126 |
| By-products | 103 |

The by-products are the same as in Example 9.

The crotonaldehyde conversion rate is 70 percent and the crotonic acid yield is 76 percent.

It will be understood that changes may be made in the details of formulation, materials and operating conditions without departing from the spirit of the invention, especially as defined in the following claims.

I claim:

1. A process for oxidizing an aliphatic aldehyde having four or five carbon atoms in the molecule and a normal or methyl branched chain which may contain an olefinic linkage not situated at the end of the chain to the corresponding aliphatic carboxylic acid, comprising reacting the aliphatic aldehyde in a liquid medium through which an oxygen containing gas is passed, in which liquid medium is heterogeneous in that it contains an aqueous phase and one or more liquid phases immiscible with the aqueous phase.

2. A process as claimed in claim 1 in which the heterogenous liquid medium contains two separate liquid phases, one of which is an aqueous phase and the other of which is an organic phase.

3. A process as claimed in claim 1 in which the volume of the separate aqueous phase is at least two percent of the total volume of the reaction medium.

4. A process as claimed in claim 1 in which the volume of separate aqueous phase is within the range of 5 to 10 percent of the total volume of the reaction medium.

5. A process as claimed in claim 1 in which the initial amount of water in the reaction medium is within the range of 10 to 20 percent of the volume of the reaction medium.

6. A process as claimed in claim 1 in which the reaction medium includes an inhibitor to prevent secondary reactions.

7. A process as claimed in claim 1 in which an inert diluent which is substantially water immiscible under the operation conditions is present in the reaction medium.

8. A process as claimed in claim 7 in which the diluent is selected from the group consisting of an ester, an ether, a hydrocarbon and mixture thereof.

9. A process as claimed in claim 8 in which the diluent is selected from the group consisting of n-butyl acetate, di-n-butyl ether, toluene and mixtures thereof.

10. A process as claimed in claim 1 in which the reaction is carried out at a temperature within the range of 10 to 65° C.

11. A process as claimed in claim 1 in which the reaction is carried out under a pressure within the range of atmospheric pressure to a pressure of 5 bars.

12. A process as claimed in claim 1 in which the reaction is carried out batchwise and in which the initial amount of water in the reaction medium is such that the reaction mixture remains heterogeneous at least for about ⅘ of the duration of the operation.

13. A process as claimed in claim 1 wherein the operation is carried out continuously in a reactor and includes the steps of continuously feeding the aldehyde to be oxidized to the reactor, continuously withdrawing a corresponding amount of reaction mixture from the reactor, subjecting the reaction mixture to decantation, returning the aqueous layer from the decantation to the reactor and feeding to the reactor an amount of water to compensate for the amount of water withdrawn in dissolved state with the organic layer from the decantation.

14. A process as claimed in claim 13 in which the separation rate of the liquid phase in the reactor is controlled through the introduction of water.

References Cited

FOREIGN PATENTS

| 40/24,176 | 10/1965 | Japan | 260—530U |
| 39/26,835 | 11/1964 | Japan | 260—530U |

JAMES A. PATTEN, Primary Examiner

R. D. KELLY, Assistant Examiner

U.S. Cl. X.R.

260—494, 530N, 593R, 638R